United States Patent [19]

Ballova et al.

[11] Patent Number: 5,464,915
[45] Date of Patent: Nov. 7, 1995

[54] METHOD OF PREPARING STYRENE POLYMERS BY SUSPENSION POLYMERIZATION

[75] Inventors: Galina D. Ballova; Vladimir G. Rupyshev, both of S. Peterburg; Sergei G. Rumyantsev, Omsk; Viktor V. Amosov; Igor A. Mekhed, both of Angarsk; Larisa V. Alexeeva, S. Peterburg; Viktor A. Pykhtin; Mikhail D. Rolnik, both of Angarsk; Evgenia N. Eremina, S. Peterburg; Valentina P. Shamina, S. Peterburg; Larisa F. Maladzyanova, S. Peterburg; Valentina G. Karmakova, S. Peterburg; Svetiana V. Kusheverskaya, S. Peterburg; Vera K. Abramova, S. Peterburg; Mikhail G. Rozhavsky, S. Peterburg, all of Russian Federation

[73] Assignees: Plastpolymer Share Holding Company, St. Peterburg; Angarsk Oil Chemical Share Holding Company, Angarsk, both of Russian Federation

[21] Appl. No.: 39,470
[22] PCT Filed: Jun. 25, 1991
[86] PCT No.: PCT/SU91/00122
    § 371 Date: Apr. 26, 1993
    § 102(e) Date: Apr. 26, 1993
[87] PCT Pub. No.: WO93/00374

PCT Pub. Date: Jan. 7, 1993

[51] Int. Cl.$^6$ ............................................. C08F 2/18
[52] U.S. Cl. .................... 526/225; 525/243; 525/261; 525/353; 526/336; 526/340; 526/340.1; 526/329.7; 526/342; 526/910; 526/911
[58] Field of Search ................. 525/243, 261; 526/910, 225

[56] References Cited

U.S. PATENT DOCUMENTS

| | | | |
|---|---|---|---|
| 3,882,195 | 6/1975 | Daniels | 526/201 |
| 3,919,355 | 11/1975 | Ballova | 525/255 |
| 4,433,108 | 2/1984 | Keppler | 525/255 |

*Primary Examiner*—Fred Zitomer
*Attorney, Agent, or Firm*—Lilling & Lilling

[57] ABSTRACT

In a method of preparing styrene plastics, the water medium containing tricalcium phosphate is prepared in situ (0.15 to 1.5 wt. %). Then, calcium carbonate (0.07 to 0.35 wt. %) is heated and dispersed therein. Thereafter, the monomer/comonomers/prepolymer, and secondary sodium alkylsulphates (0.001 to 0.020 wt. %) are introduced into the suspension polymerization process at 15 to 47% conversion. This method permits production of styrene plastics using a common technology, while providing specified bead size distribution, low concentration of dust fractions, and enhancement of the process stability.

7 Claims, No Drawings

METHOD OF PREPARING STYRENE POLYMERS BY SUSPENSION POLYMERIZATION

FIELD OF THE INVENTION

The present invention relates to the production of polymeric materials or, more specifically, to methods used to prepare styrene plastics by suspension (mass-suspension) polymerization. The styrene plastics include polymers and copolymers of styrene or vinyltoluene, expandable (foamable) polystyrene or polyvinyltoluene, expandable copolymers of styrene or vinyltoluene and methylmethacrylate, copolymers of styrene or vinyltoluene and acrylonitrile, methylmethacrylate, or divinylbenzene, and impact resistant copolymers of styrene or vinyltoluene, acrylonitrile or methylmethacrylate, and rubber.

Said materials have found extensive applications in the manufacture of industrial and household products, including food packing, in the radio industries, in building and construction, lighting fixtures, electronics, electrical equipment, in the production of ion-exchange resins, in reproduction and printing technologies, etc.

DESCRIPTION OF THE PRIOR ART

Low water soluble phosphates rank as the most effective suspension stabilizers. These may be in the form of fine-sized tricalcium phosphate, hydroxyapatite, or trimagnesium phosphate powders, or freshly prepared (in-situ) tricalcium phosphate suspension obtained by pouring together aqueous solutions of trisodium phosphate and calcium chloride. In any case the low soluble phosphate reveals its suspension stabilizer function only in the presence of a surface active agent which serves to change the sign of the surface charge of the organic particles (monomer droplets or polymer beads). Normally, the surface active agent is introduced into the water before the organic suspension is obtained; no surface active agent will lead to the suspension becoming unstable, at a certain monomer conversion level different for different monomers, and to agglomeration.

There is known a method for preparing polystyrene by polymerizing styrene in an aqueous suspension in the presence of a stabilizing system comprising fine-sized tricalcium phosphate (ready-for-use), sodium bisulphate or potassium persulphate, and aminoalkanesulfonic acid as surface active agent in the amount of 0.02 to 5 wt. % (U.S. Pat. No. 4,129,707). The beads obtainable by said method feature a low size distribution index of between 12.6 and 45% (percentage ratio of standard deviation to mean bead size). The lower the bead size distribution index, the lower the content in the beads of too fine and too coarse fractions, both undesirable.

The method according to U.S. Pat. No. 4,129,707 is disadvantageous in that it uses ready-for-use tricalcium phosphate, considering that in this case very high purity levels are required of the styrene and polymerization water to be used: water conductivity to be not higher than $3 \times 10^{-11}$ $\Omega$/cm. At the same time, the impurities contained in the styrene, e.g. benzaldehyde, are extracted by water in the dispersion process, leading to bead agglomeration. High source material purity requirements will increase the process costs taken on the whole. Besides, the use of aminoalkanesulfonic acid as a surfactant will complicate the waste water treatment process.

There is known a method for preparing expandable polystyrene by suspension polymerization of styrene in the presence of in-situ tricalcium phosphate and a surfactant in the form of at least one of the water soluble calcium slats of an aliphatic or aromatic carboxylic acid introduced in the amount of 0.5 to 20% of the weight of the suspension stabilizer into the water phase before styrene is dispersed therein (CS,A, 232171). In the course of polymerization, sodium dinaphtylmethanedisulfonate is added for process stabilization in the amount of 1% of the total suspension stabilizer weight when the styrene conversion reaches the level of about 75%. The method permits of obtaining beads with a mean diameter of 1.0 to 2.4 mm and a low size distribution index (14–25%).

This method, just as the one previously described, is disadvantageous in that it involves high costs due to the high source material purity requirements—as regards water and styrene, as well as trisodium phosphate and calcium chloride used to prepare tricalcium phosphate in situ. Thus, for the polymerization process to be carried out, desalted water must be additionally treated using reverse osmosis techniques.

Another disadvantage inherent in this method is related to the fact that, on reaching the styrene conversion level of 75%, the suspension stability has to be enhanced by adding a large amount of sodium dinaphtylmethanedisulfonate. However, considering that at this conversion level the polymer beads are practically solid, no precise and fast monomer conversion determinations are any longer possible, inasmuch as all known physical and chemical methods usable for conversion determinations at this advanced conversion level require large time periods comparable with the duration of the polymerization cycle. Consequently, in practice, the time point when the surfactant (sodium dinaphtylmethanedisulfonate) is introduced into the polymer suspension, may be determined but approximately. The result is that in some cases the polymerization system loses stability both because of the surfactant being introduced too late and because of its being introduced too early (the enhancing effect of the added quantity of surfactant may not be enough to last till the end of the process). On the other hand, if the surfactant is added into the system with a conversion level substantially below 75%, the bead size distribution will be adversely affected.

Also, each of the methods considered (U.S. Pat. No. 4,129,707 and CS, A, 232171) allows of preparing only one specific type of styrene plastic and is unsuitable for complex polymerization systems comprising several comonomers or, moreover, a prepolymer based on styrene (or vinyltoluene) and rubber.

There is known a method for preparing styrene plastics and, specifically, shock-resistant copolymers of styrene or vinyltoluene and rubber (U.S. Pat. No. 3,919,355), wherein a prepolymer of styrene or vinyltoluene and rubber is subjected to suspension polymerization in an aqueous medium at a prepolymer-to-water ratio of between 5:3 and 10:3 in the presence of a stabilizing system and radical-forming initiators. The stabilizing system comprises 0.15–1.5 wt. % of tricalcium phosphate obtained by merging sodium phosphate and calcium chloride solutions, 0.003–0.02 wt. % of a mixture of secondary sodium alkylsulphates, and 0.15–0.35 wt. % of calcium carbonate. The secondary sodium alkylsulphates have the general formula of R—OSO$_3$Na, where R is a hydrocarbon radical with 8 to 18 carbon atoms. According to this method, a previously obtained prepolymer based on styrene or vinyltoluene and rubber is loaded into a reactor containing a "water" phase with an addition of tricalcium phosphate and secondary sodium alkylsulphates, said water phase being maintained at room temperature (20° C.). Next, peroxide initiators are introduced into the suspension at a temperature not exceeding 40°–50° C., and polymerization is carried out by heating to 130° C. during a period of 6 hours. During said period, a third component of the stabilizing system, viz. calcium carbonate in the afore-mentioned amount, is added to the suspension at a temperature of up to 90° C.

Although the above method relates specifically to impact resist and styrene-rubber copolymers, it can also be used to prepare other styrene plastics, if products other than a styrene- and rubber-based prepolymer are taken as starting materials suitable for suspension polymerization, such as, e.g., styrene or a methyl derivative thereof, comonomers of, or prepolymers based on, styrene or a methyl derivative thereof and derivatives of acrylic and/or methacrylic acids or divinylbenzene, or else a prepolymer based on styrene or a methyl derivative thereof, derivatives of acrylic and/or methacrylic acids, and rubber.

However, property requirements applicable to different species of styrene plastics are quite different. For example, the determining parameter for expandable polystyrene or styrene—divinylbenzene copolymers is particle size distribution, as well as its spread, while for graft copolymers of styrene or a methyl derivative thereof, derivatives of acrylic and/or methacrylic acids, and rubber, with their polymerization systems characterized by high vescosity, clarity, colour, etc. are of great importance. In this connection, the method according to U.S. Pat. No. 3,919,355 is not an optimal one for a number of styrene plastics.

Specifically, this method does not permit obtaining beads with a narrow size distribution (size distribution index 12 to 45). The explanation is that tricalcium phosphate prepared in situ at room temperature has a fairly small particle (aggregate) size of about 0.01 to 0.03 μm. This suspension stabilizer has an extremely high total particle surface area capable of "protecting" the high total surface area of the "oil" phase droplets, and this, in turn, will lead to increasing the oil phase surface area due to size reduction of oil droplets. In the subsequent process of heating the reaction mass in the absence of calcium carbonate (which is introduced in the polymerization process at the temperature not over of 90° C., as previously stated), the tricalcium phosphate "matures" under the influence of temperature, but, as the maturing process occurs, first, under unstable pH conditions owing to there being no calcium carbonate present and, second, on the oil surface and not throughout the "water" phase volume, the resultant matured tricalcium phosphate particles show a wide size spread. This being so, there are present in the system both large polymer particles stabilized by likewise large tricalcium phosphate particles and small polymer particles, as initially formed and failing to aggregate for lack of time before the reaction mass has reached a certain level of viscosity. Also contributing to the size spread in tricalcium phosphate aggregates and polymer beads is the difference in temperature between the water and oil phases.

The temperature difference factor becomes of particular importance where high-viscosity systems are stabilized, such as formed in the preparation of such copolymer species as styrene-methylmethacrylate-rubber, styrene-acrilonitrile-rubber, and like products: the thermal stresses occurring on the surface of oil phase droplets in the reactor in the course of dispersion may lead to degradation of the protective surface coagulation structures which are low in stability and strength when just formed.

The presence of large amounts (up to 20 wt. %) of dust-like fractions, i.e. particles of less than 0.2 mm in size, more especially so in products obtained purely by the suspension process, is also due to the surface active agent, i.e. secondary sodium alkylsulphates, being introduced into the water phase at the stage of its preparation, before dispersing therein the product to be polymerized. The large quantity of polymeric dust affects the normal operation of the centrifuges when polymer is separated from the water phase, with the main part of the dust joining the waste waters and thus making their effective cleaning more of a problem.

Besides, a water phase containing tricalcium phosphate and secondary sodium alkylphosphates only is characterized by its pH value changing with time and varying from the neutral value (equal to about 7.0) which should be desirably maintained during suspension polymerization. At high pH values (10 to 11), the radical-forming initiators degrade to form reaction by-products (benzoic acid, benzaldehyde, etc.) impairing the quality of the end product (odour, colour), while at low pH values (below 5.5) there is the danger of agglomeration because the decreasing pH value of the system leads to reducing such tricalcium phosphate characteristic as the pH value at the zero charge point (down to 6 and lower), and low pH values at the zero charge point are characteristic of tricalcium phosphates with low stabilizing. Under such conditions, the stabilizing properties of tricalcium phosphate may fail to recover if calcium carbonate happens to be introduced too late. Therefore, a water phase prepared in this manner retains its stabilizing properties for a mere 1 to 2 hours depending on the use temperature), losing them thereafter.

Still another disadvantage of the method under consideration lies in the fact that, with the dispersion of the product to be polymerized being carried out in a cold water phase, the process of heating the suspension to the temperature, at which polymerization begins (75° to 90° C. depending on the polymer grade to be produced), takes a fairly long time. Thus, with the polymerization process carried out in a reactor of 10 m³ capacity, the heating of its contents from room temperature to 75°–90° C. takes 1.5 to 2 hours. For larger capacity reactors (40 to 100 m³), these unproductive time consumptions are 2 to 3 times greater.

Thus, the main disadvantages of the method according to U.S. Pat. No. 3,919,355 stem from the constitution of the stabilizing system which the method uses. It will be noted that the present world practice is to produce styrene plastics using different stabilizing systems, which makes it impossible to standardize the suspension polymerization technology and complicates the waste water treatment process owing to the presence in the waste waters of remnants of several stabilizing systems.

SUMMARY OF THE INVENTION

The invention is based upon the objective of providing a method to produce styrene plastics by suspension polymerization or copolymerization, wherein the components of the stabilizing system would be introduced into the water phase and into the suspension containing one monomer or comonomers or a prepolymer in a manner such as to assure production of beads of a specified size distribution, with a low content of dust-like fraction, as well as standardization of the technology involved in the polymerization or copolymerization process, with the duration of the process reduced and its stability enhanced.

The objective as stated above is achieved by providing a method to produce styrene plastics by suspension or mass-suspension polymerization of styrene or a methyl derivative thereof, or by suspension or mass-suspension copolymerization of styrene or a methyl derivative thereof and derivatives of acrylic and/or methacrylic acids or divinylbenzene, or by mass-suspension copolymerization of styrene or a methyl derivative thereof, derivatives of acrylic and/or methacrylic acids, and rubber in an aqueous medium, in the presence of a stabilizing system comprising 0.15 to 1.5 percent by weight of tricalcium phosphate prepared in-situ, calcium carbonate, and a mixture of secondary sodium alkylsulphates of the general formula R—OSO$_3$Na, where R is a hydrocarbon radical with 8 to 18 carbon atoms. In accordance with the invention, calcium carbonate in an amount of between 0.07 and 0.35 percent by weight is introduced into an aqueous suspension of in-situ tricalcium phosphate, and the mixture thus obtained is heated before dispersion therein the monomer or comonomers or prepolymer to be polymerized, while the mixture of secondary sodium alkylsulphates in an amount of between 0.001 and 0.020 percent by weight is introduced into the suspension polymerization process when the conversion of the monomer or comonomers or prepolymer is at 15 to 47 percent.

Introducing calcium carbonate into an aqueous suspension of tricalcium phosphate, followed by heating the water phase before the product to be polymerized is dispersed therein, will stabilize the Ph value of the water phase within 6.5. to 7.2. in a matter of no less than 24 hours. This pH value is optimal from the standpoint of chemical composition stability of tricalcium phosphate, with the tricalcium phosphate suspension being not in a highly dispersed state in this case though having no oversized particles at the same time, while the pH value at the zero charge point does not fall below 6.5. This provides for the stability of the subsequent polymerization process. Also, heating the water phase before dispersing the product to be polymerized therein will contribute to the reduction of the polymerization cycle time.

Addition of the third component of the stabilizing system, i.e. secondary sodium alkylsulphates, at a stage following the beginning of the polymerization process, in conjunction with the afore-mentioned inventive features (introduction of calcium carbonate at the stage of water phase preparation and heating the water phase), makes it possible to obtain beads of a specified size distribution and with a low dust fraction content. Based on the use of the proposed stabilizing system, bead size control is achieved, as will be shown herein-under, by selection of a conversion level, at which to add secondary sodium alkylsulphates into the polymerization process. In the known methods used in the commercial practice of styrene plastics production, the surface active agent is introduced into the water phase before the polymerization process begins, because the general opinion is that no surfactant in the reaction mass at a relatively high monomer/comonomers conversion will inevitably lead to agglomeration.

Next, as shown by our investigations, the afore-stated sequence of introduction of stabilizing system components into the polymerization process, coupled with the heating of the initial water phase, provides for standardization of the technology involved in preparation of all types of styrene plastics without any detriment to their quality. Thus, the proposed method is suitable for the preparation of polymers and copolymers of styrene or a methyl derivative thereof, including impact grades, expandable polystyrene or polyvinyltoluene, expandable copolymers of styrene or vinyltoluene and methylmethacrylate, copolymers of styrene or vinyltoluene, acrylonitrile, methylmethacrylate, or divinylbenzene, etc.

The low dust content in the end product and the standardized technology applicable to preparation of different styrene plastics contribute to easier waste water treatment, the effluents containing remnants of only one stabilizing system if the proposed method should be used.

The aqueous suspension of mixed in-situ tricalcium phosphate and calcium carbonate should preferably be heated to a temperature of between 70° and 90° C.

Where the products to be polymerized are styrene or a methyl derivative thereof, or styrene or a methyl derivative thereof and derivatives of acrylic and/or methacrylic acids as comonomers, it is advisable that the mixture of secondary sodium alkylsulphates be introduced into the suspension polymerization process when the conversion level of said monomer or comonomers is at 25 to 47 percent.

Where the product to be polymerized is a prepolymer based on rubber and styrene or a methyl derivative thereof, or a prepolymer based on rubber and comonomers comprising styrene or a methyl derivative thereof and derivatives of acrylic and/or methacrylic acids, it is advisable that the mixture of secondary sodium alkylsulphates be introduced into the suspension polymerization process when the conversion level of said prepolymer is at 15 to 35 percent.

In order to intensify the polymerization process, it is convenient for the monomer or comonomers to be heated to a temperature of between 70° and 90° C. before they are dispersed.

In-situ tricalcium phosphate may be obtained by pouring together a solution of calcium chloride containing 6 water molecules and a solution of trisodium phosphate containing 12 water molecules.

Where the suspension polymerization process is carried out in the presence of radical-forming initiators, at least some part of their total quantity may be introduced into the monomer/comonomers/prepolymer suspension at a temperature of 70° to 90° C.

BEST MODE TO CARRY OUT THE INVENTION

The proposed method is realized as follows.

A suspension of tricalcium phosphate is prepared in demineralized (desalted) water to a concentration of 0.15 to 1.5 percent by weight by pouring together calcium chloride and trisodium phosphate solutions. The calcium chloride and trisodium phosphate to be used can be used both as hydrates (CaCl$_2$.6H$_2$O, CaCl$_2$.2H$_2$O, Na$_3$PO$_4$.2H$_2$O, Na$_3$PO$_4$.12H$_2$O) as anhydrous (CaCl$_2$ and Na$_3$PO$_4$).

Calcium carbonate is added to the suspension in an amount of between 0.15 and 0.35 percent by weight not later than 30 to 40 minutes after its preparation, and the suspension is heated. Heating the tricalcium phosphate suspension is the presence of calcium carbonate will improve the stabilizing properties of the "water" phase by obtaining an optimal tricalcium phosphate particle size distribution in the suspension and by stabilizing the pH value of the suspension within 6.5 to 7.2.

The optimum particle size distribution of tricalcium phosphate is achieved as a result of the tricalcium phosphate precipitate "maturing" during heating, with complex processes occurring during this interval, including recrystallization of originally formed crystals, aggregation of small particles, adsorption of potential-determining ions on particle surfaces, hydrolysis of these ions, and, as a consequence thereof, emergence of a surface charge. All these provide a high stabilizing capability for tricalcium phosphate precipitate particles on the subsequent modification of these by an anion-active surfactant. The presence of calcium carbonate at the very early stages of these processes enables exclusion of a spontaneous reduction of the pH value of the water phase, preventing thereby the hydrolysis reactions from proceeding to a point where irreversible changes would occur in the condition of the precipitate surface (down to its dissolution). Besides, the presence of calcium carbonate influences the pH value at the zero charge point, assuring stabilization of this parameter at a level not lower than 6.5, which is characteristic for a tricalcium phosphate with high stabilizing capability.

It is advisable that the water phase be heated to a temperature of between 70° to 90° C. because the process of stabilizing the pH value is slower when the water phase is heated below 70° C., with the result that the size distribution of the beads obtained will be somewhat poorer.

Next, the product to be polymerized is loaded, with continuous stirring, into the hot water phase (direct loading), or, vice versa, the water phase is loaded into the product to be polymerized (reverse loading). The product to be polymerized may be styrene or a methyl derivative thereof (vinyltoluene), or a mixture of styrene (or vinyltoluene) and derivatives of acrylic and/or methacrylic acids (methylmethacrylate, acrylonitrile) or divinylbenzene, or styrene and comonomers (styrene-methylmethacrylate-acrylonitrile, styrene-acrylonitrile, styrene-methylmethacrylate, vinyltoluene-methylmethacrylate-acrylonitrile, vinyltoluene-acrylonitrile, vinyltoluene-methylmethacrylate), or a prepolymer based on rubber, styrene or a methyl derivative thereof, and derivatives of acrylic and/or methacrylic acids (styrene-rubber, vinyltoluene-rubber, styrene-rubber-acrylonitrile, styrene-rubber-methylmethacrylate, vinyltoluene-rubber-acrylonitrile, vinyltoluene-rubber-methylmethacrylate).

The above prepolymers based on styrene or vinyltoluene and rubber may be prepared as described in U.S. Pat. No. 3,919,355. Their preparation may be carried out in the presence of radical-forming initiator substances, as well as by way of thermal initiation. The rubbers that can be used include polybutadienes of various structures, styrene-butadiene, isoprene, pentadiene, silicone, and ethylene-propylene rubbers, as well as their block copolymers of various compositions and structures, with or without polystyrene blocks included in their composition.

The ratio of the weight of the product to be polymerized to the weight of the water phase (both ratio) is between 5:3 and 10:3 (preferably between 5:3 and 3:1).

Before dispersion in the aqueous medium, the product to be polymerized may be desirably heated to a temperature of between 70° and 90° C. (and further cooled if this product is a prepolymer based on styrene or vinyltoluene and rubber) for intensification of the polymerization process and enhancing its stability.

Radical-forming initiators are introduced into the suspension obtained, such as benzoyl peroxide, a mixture of benzoyl peroxide and tert-butyl perbenzoate, a mixture of lauryl peroxide and tert-butyl perbenzoate, dicumyl peroxide, a mixture of dicumyl peroxide and benzoyl peroxide, azodiisobutyronitrile, etc. We have discovered that with peroxide initiators (which are oil soluble substances) introduced into a water suspension at a temperature of between 70° and 90° C., i.e. practically at the polymerization temperature, their reactivity is by no means lowered, and they will not affect the chemical and physical properties of the polymers obtained. At the same time, introducing initiators at said temperature will additionally guarantee the stability of the polymerization process, reducing the probability of complications arising during the course of the process in case there has been an error made during the preparation of the water phase.

It should be noted that a radical-forming initiator may also be introduced directly into the oil phase, i.e. into the product to be polymerized before its dispersion in the water phase, as well as in two stages, with one portion added to the oil phase, and the other following the introduction of secondary sodium alkylsulphates. Besides, it is possible for the first portion of initiators to be introduced while dispersing the product to be polymerized in the water phase, and the second portion to be added after introducing the secondary sodium alkylsulphates into the suspension. The order of initiator introduction and the choice of specific initiators depend upon the type of the polymer to be obtained.

The product loaded into the water phase is subjected to suspension of mass-suspension polymerization. Polymerization is effected by heating the suspension to a temperature not exceeding 140° C. Molecular weight regulators may also be used in the polymerization process, such as normal and tertiary dodecyl mercaptans, α-methylstyrene dimer, and the like. Also, additives may be introduced into the polymerization process, such as plasticizers (vaseline oil, dioctyl phthalate, etc.), light and heat stabilizers, flame retardants, optical whiteners, and so on.

In the process of suspension polymerization/copolymerization, when the monomer/comonomers/prepolymer conversion reaches a level of between 15 and 47 percent, there is introduced the third component of the stabilizing system, i.e. a mixture of secondary sodium alkylsulphates of the general formula R—$OSO_3Na$, where R is a hydrocarbon radical with 8 to 18 carbon atoms. The specific conversion value within the above range is selected based on the desired properties of the end product, as shown in the examples cited hereinunder. Where the polymerization system contains no rubber, the preferable conversion subrange is 25 to 47 percent; the system in this case has an optimal viscosity value and permits of obtaining a polymer with a specified bead size distribution and practically dust-free. In case the polymerization system does contain rubber, the preferable conversion subrange is 15 to 35 percent.

The quantity of added surfactant, limited to within 0.001–0.020 percent by weight, is also dependent upon consideration associated with the obtainment of a specified bead size distribution. At concentrations of mixture of secondary sodium alkylsulphates of less than 0.001 percent by weight, there is heavy adherence of polymer to the reactor walls, stirrer blades, and baffles—down to complete agglomeration of the reaction mass. If, on the other hand, the concentration exceeds 0.020 percent by weight, the result is deteriorating bead size distribution, with increasing dust fraction content, and possible agglomeration of the polymerization system due to a change of sign in the tricalcium phosphate charge in case this value is considerably exceeded.

Where the product is expandable polystyrene/polyvinyltoluene or expandable copolymer of styrene/vinyltoluene and methylmethacrylate, a foaming agent is introduced at 70 to 95 percent monomer/comonomers conversion. The foaming agents that can be used include pentane, isopentane, their mixtures, or the pentane fraction from oil refining processes, in an amount of, e.g., 3 to 8 percent of the monomer/comonomers weight.

On completion of the polymerization process, the final suspension in transferred from the reactor to a buffer vessel, where hydrochloric acid is added to decompose the tricalcium phosphate, then the suspension is centrifuged, and the polystyrene separated from water is dried in, e.g., a drum-type drier. The dried product with a water content of less than 0.1 percent is granulated if so required.

For better illustration, specific examples of practical embodiment of the invention are cited hereinunder.

EXAMPLE 1

Preparation of Self-extinguishing Expandable Polystyrene with a Bead Diameter of 1.2 to 1.5 mm Styrene is charge into a reactor of 11 m$^3$ capacity in the amount of 6.4 m$^3$, the stirrer started, and the water phase prepared in advance at 20° C. and heated to 90° C. pumped in the amount of 3.9 m$^3$, the water phase containing 0.3 wt. % of tricalcium phosphate prepared in situ and 0.1 wt. % of calcium carbonate. The tricalcium phosphate is obtained by pouring together a solution containing trisodium phosphate as hydrate containing 12 water molecules (Na$_3$PO$_4$.12H$_2$O) and a solution containing calcium chloride as hydrate containing 6 water molecules (CaCl$_2$.6H$_2$O), with calcium carbonate being added to the tricalcium phosphate so obtained not later than 20 to 30 minutes after the pouring-together of said solutions.

Benzoyl peroxide in the amount of 0.2 wt. % and tert-butyl perbenzoate in the amount of 0.15 wt. % are added as radical-forming initiators to the reaction mass so obtained and having a temperature of 72° C. The reaction mass is heated to 90° C. during 30 to 45 minutes and held at this temperature for 7 hours. Without bringing the polymerization system in the reactor to complete suspension, as determined by samples taken from the reactor, hexabromocyclododecane in the amount of 1 wt. % (60 kg) dissolved in 200 l of styrene is charged in as flame retardant. The styrene conversion at this point is 42 percent. 15 minutes later, a mixture of secondary sodium alkylsulphates is added into the reactor in the amount of 0.0020 wt. %. The bath ratio is 5:3.

After checking the suspension for stability, the reactor is sealed, and isopentane is charged in as foaming agent, in the amount of 8 wt. % at a pressure of 5 to 8 atm gauge, for a period of 30 minutes, with the polymerization process continued. On completion of the holding time (holding the reaction mass at 90° C.), the temperature is raised to 130° C. during 3 hours at the rate of 13° C. per hour. Holding at 130° C. is 2 hours.

Next, the contents of the reactor is cooled down to 50° C. and discharged into a buffer vessel where it is acidified to pH=2 to decompose the tricalcium phosphate. Then the beads are dewatered on a centrifuge and allowed to dry.

Bead size distribution:

| | |
|---|---|
| Mean diameter | 1.4 mm |
| Distribution index | 20.2 |
| Fractions with a particle diameter of less than 0.2 mm | 0.5 wt. % |

Physical properties of the end product:

| | |
|---|---|
| Relative viscosity | 1.95 |
| Weight fraction of residual styrene | 0.05 wt. % |
| Apparent density | 20 kg/m$^3$ |
| Weight fraction of water | 0.10 wt. % |

EXAMPLE 2

Preparation of Expandable Polystyrene with a Bead Diameter of 2.5 to 3.0 mm

The process is carried out essentially as described in Example 1, except that no hexabromocyclododecane is introduced into the polymerization system. The bath ratio is 2:1. The concentration of tricalcium phosphate in the water phase is 0.15 wt. %, that of calcium carbonate 0.07 wt. %, and the mixture of secondary sodium alkylsulphates in the amount of 0.001 wt. % is added at 47% styrene conversion.

Bead size distribution:

| | |
|---|---|
| Mean diameter | 3.0 mm |
| Distribution index | 16.3 |
| Fractions with a particle diameter of less than 0.2 mm | 0.2 wt. % |

Physical properties of the end product:

| | |
|---|---|
| Relative viscosity | 2.05 |
| Weight fraction of styrene | 0.04 wt. % |
| Apparent density | 14 kg/m$^3$ |
| Ultimate bending stress | 3.4 kg/cm$^2$ |

EXAMPLE 3

Preparation of Styrene-acrylonitrile Copolymer

A water phase based on in-situ tricalcium phosphate (0.4 wt. %) obtained by pouring together at 20° C. a solution containing trisodium phosphate as hydrate containing 12 water molecules and a solution containing anhydrous calcium chloride (0.15 wt. %), with calcium carbonate (0.15 wt. %) added not later than 20 to 30 minutes after the pouring-together of said solutions, prepared in advance and heated to 85° C. is charged into a reactor of 50 l capacity, with stirring. Then an oil phase is introduced into the reactor in an amount providing for an oil-to-water phase ratio (bath ratio) of 5:3.

Oil phase composition:

| | |
|---|---|
| Styrene | 116.2 parts by weight |
| Acrylonitrile | 38.8 parts by weight |
| Lauryl peroxide | 0.62 parts by weight |
| Tert-butyl perbenzoate | 0.12 parts by weight |
| Tert-dodecyl mercaptan | 0.18 parts by weight |

The temperature of the reaction mass is brought up to 72° C., and polymerization is continued for 3 to 3.5 hours. Without bringing the polymerization system to complete separation, as determined by samples taken from the reactor, a mixture of secondary sodium alkylsulphates is charged into the reactor in the amount of 0.005 wt. %. Conversion of the comonomers at this point is 25%. Then polymerization is continued at 72° C. for another 1.5 to 2 hours, following which the temperature is raised to 132° C. over a period of 3 hours, and the reaction mass is held for 2 hours at this temperature.

Then the reactor contents is cooled, acidified to pH=2 to 3, water washed, centrifuged, and dried.

The polymer obtained has the following properties;

| | |
|---|---|
| Residual monomer | 0.02 wt. % |
| Charpy impact strength, notched | 2.2 kJ/m$^2$ |
| Vicat softening point | 104° C. |
| Fractions with a particle diameter of less than 0.2 mm | 0.2 wt. % |

EXAMPLE 4

Preparation of Gel-structured Styrene-divinylbenzene Copolymer (Intermediate Product for Production of Anion-exchange Resins) with a Bead Diameter of 0.4 to 0.8 mm A water phase based on in-situ tricalcium phosphate (0.5 wt. %) obtained as described in Example 1 and calcium carbonate (0.17 wt. %) based not later than 20 to 30 minutes after the preparation of tricalcium phosphate, is charged, with stirring, into a reactor of 10 m$^3$ capacity, the water phase having been previously heated to 70° C. An oil phase is charged into the hot water phase in an amount providing for a bath ratio of 5:3.

Oil phase composition:

| | |
|---|---|
| Styrene | 85.93 parts by weight |
| Divinylbenzene (technical grade) | 13.61 parts by weight |
| Benzoyl peroxide | 0.46 parts by weight |

The temperature in the reactor is raised to 75° C. over 1 to 1.5 hours, and polymerization is carried out for 4 hours. Without bringing the polymerization system to complete separation, as determined by samples taken from the reactor, secondary sodium alkylsulphates are charged into the reactor in the amount of 0.006 wt. %. The conversion of comonomers at this point is 37%. On completion of the holding period, the temperature is raised to 100° C. over 0.5 to 1 hour, and the reaction mass is held at this temperature for another 2 hours.

The final suspension is cooled, filtered, diluted with condensate and steamed to remove the unreacted monomers and non-polymerizable impurities. After steaming, the suspension is acidified to pH=2 to 3, the beads are centrifuged and dried.

Bead size distribution:

| | |
|---|---|
| Mean diameter | 0.5 mm |
| Distribution index | 20.3 |
| Fractions with a particle diameter of less than 0.2 mm | 0.2 wt. % |

The copolymer obtained has the following properties:

| | |
|---|---|
| Specific volume of swollen copolymer (in toluene) | 2.6 cm$^3$/g |

-continued

| | |
|---|---|
| Weight fraction of water | 0.09 wt. % |
| Weight fraction of volatile impurities | 0.005 wt. % |

EXAMPLE 5

Preparation of General-purpose Polystyrene

The water phase is prepared as described in Example 3, but using anhydrous trisodium phosphate and calcium chloride as hydrate containing 2 water molecules. Then the oil phase is charged into the reactor in an amount providing a bath ratio of 5:3.

Oil phase composition:

| | |
|---|---|
| Styrene | 155 parts by weight |
| Benzoyl peroxide | 0.12 parts by weight |
| Tert-butyl perbenzoate | 0.10 parts by weight |

The temperature in the reactor is raised to 90° C., and the polymerization process is carried out at this temperature for 5 to 5.5 hours. Without bringing the polymerization system to complete separation, as determined by samples taken from the reactor, a mixture of secondary sodium alkylsulphates is charged into the reactor in the amount of 0.008 wt. %. Styrene conversion at this point is 40%. On completion of the 90° C. holding period, the temperature in the reactor is raised to 130° C. over 3 hours, and the reaction mass is held at this temperature for 2 hours.

Then the reactor contents is cooled, acidified to pH=2 to 3, water washed, and the beads are centrifuged and dried.

The polymer so obtained has the following properties:

| | |
|---|---|
| Residual monomer | 0.04 wt. % |
| Charpy impact strength, notched | 2.5 kJ/m$^2$ |
| Vicat softening point | 101° C. |
| Melt flow index | 3.1 g/10 min |
| Fractions with a particle diameter of below 0.2 mm | 0.2 wt. % |

EXAMPLE 6

Preparation of Styrene-methylmethacrylate-acrylonitrile Copolymer

The water phase is prepared as described in Example 3 except that trisodium phosphate is used as hydrate with 2 water molecules (Na$_3$PO$_4$.2H$_2$O) and anhydrous calcium chloride, and the water phase is heated to 75° C. Then the oil phase is charged into the reactor in an amount to provide for a bath ratio of 5:3.

Oil phase composition:

| | |
|---|---|
| Styrene | 62 parts by weight |
| Methylmethacrylate | 81.5 parts by weight |
| Acrylonitrile | 11.5 parts by weight |
| Benzoyl peroxide | 0.65 parts by weight |
| Tert-dodecyl mercaptan | 0.18 parts by weight |

The temperature in the reactor is raised to 75° C., and the polymerization process is carried out for 4.5 hours. Without bringing the polymerization system to complete separation, as determined by samples taken from the reactor, secondary sodium alkylsulphates are charged thereinto in the amount of 0.005 wt. %. The conversion level at this point is 28%. On completion of the holding time, the temperature is raised to 110° C. during 1 hour, and the reaction mass is held at this temperature for 1 hour.

The reactor charge is cooled, acidified to pH=2, water washed, centrifuged, and dried.

The copolymer so obtained has the following properties:

| | |
|---|---|
| Residual monomer | 0.05 wt. % |
| Charpy impact strength, unnotched | 25.5 kJ/m$^2$ |
| Melt flow index | 1.5 g/10 min |
| Fractions with a particle diameter of below 0.2 mm | 0.4 wt. % |

EXAMPLE 7

Preparation of Styrene-methylmethacrylate Copolymer

Water and oil phases are prepared and charged into the reactor essentially as described in Example 3 except that the phase has the following composition:

| | |
|---|---|
| Styrene | 62 parts by weight |
| Methylmethacrylate | 93 parts by weight |
| Azodiisobutyronitrile | 0.7 parts by weight |
| Tert-dodecyl mercaptan | 0.08 parts by weight, | and the water phase is heated to 50° C. The temperature in the reactor is raised to 80° C., and polymerization is carried out for 5 hours. Without bringing the polymerization system to complete separation, as determined by samples taken from the reactor, secondary sodium alkylsulphates are charged thereinto in the amount of 0.005 wt. %. The conversion of the comonomers at this point is 26%. On completion of the holding period, the temperature in the reactor is raised to 100° C. over 1 hour, and the reaction mass is maintained at this temperature for 1 hour. Then the reactor charge is cooled, acidified to pH=2, water washed, centrifuged, and dried.

The copolymer so obtained has the following properties:

| | |
|---|---|
| Charpy impact strength, unnotched | 23 kJ/m$^2$ |
| Residual styrene | 0.06 wt. % |
| Melt flow index | 0.9 g/10 min |
| Fractions with a particle diameter of less than 0.2 mm | 0.6 wt. % |

EXAMPLE 8

Preparation of Low-viscosity Polystyrene

The water phase is prepared as described in Example 3. Then the oil phase is charged into the reactor in an amount to provide for a bath ratio of 5:3.

Oil phase composition:

| | |
|---|---|
| Styrene | 124 parts by weight |
| Butylacrylate | 31 parts by weight |
| Benzoyl peroxide | 4.0 parts by weight |

The temperature of the reaction mass is brought up to 78° C., and polymerization is carried out for 4 hours. During the holding time at 78° C., at a monomer conversion of 25%, a mixture of secondary sodium alkylsulphates is introduced into the reactor in the amount of 0.007 wt. %. After the 78° C. holding time, the temperature in the reactor is raised to 85° C. over 30 minutes, and the reaction mass is held at this temperature for 3 hours.

The reactor charge is then cooled, acidified to pH=2–3, water washed, centrifuged, and dried.

The resultant polymer has the following properties:

| | |
|---|---|
| Ring-and-ball softening temperature | 120° C. |
| Residual styrene | 0.1 wt. % |
| Bead fractions with a particle diameter of less than 0.2 mm | 0.3 wt. % |

EXAMPLE 9

Preparation of Impact Polystyrene

Styrene (165.6 parts by weight) is charged into a reactor of 50 l capacity, the stirrer started, and butadiene rubber (10.8 parts by weight) is introduced, as well as α-methylstyrene dimer (0.03 parts by weight) as molecular weight regulator. Dissolution of rubber in styrene is carried out at 70° C. during a period of 2 hours, following which medical-grade vaseline oil (3.6 parts by weight) as plasticizer and benzoyl peroxide (0.13 parts by weight) as the first portion of radical-forming initiators are added into the reactor.

The reactor charge is heated to 90° C. over 1 hour, and prepolymerization is carried out for 3.5 hours until the styrene conversion is 30 percent. In the course of prepolymerization, α-methylstyrene dimer is additionally introduced 1, 2, and 3 hours after the beginning of the process, in portions of 0.02 parts by weight each.

The water phase is prepared at the same time, as follows. The vessel for water phase preparation is filled with desalted water, this is heated to 65° C., and trisodium phosphate containing 12 water molecules is charged thereinto. Half an hour after the charging the trisodium phosphate, anhydrous calcium chloride is added to the trisodium phosphate solution, followed, not later than 20 to 30 minutes after, by calcium carbonate in the amount of 0.15 wt. %. The tricalcium phosphate concentration in the water phase is 0.5 wt. %.

The water phase is heated at 90° C. and pumped into the reactor containing prepolymer at 30% conversion. Simultaneously, a mixture of secondary sodium alkylphosphates is introduced into the reactor in the amount of 0.005 wt. %. The bath ratio is 5:3. After dispersing the prepolymer in the water phase, a second portion of benzoyl peroxide (0.41 parts by weight) and tert-butyl perbenzoate (0.27 parts by weight) as initiators is introduced into the reaction mass (whose temperature has been lowered to 80°–85° C. due to the addition thereinto of wash water from the waste phase preparation vessel), the reaction mass is agitated for 5 to 10 minutes, and the temperature is raised to 90° C. for the reaction mass to be maintained at this temperature for 1.5 hours. Then the temperature is raised to 130° C. at an uniform rate over 3 hours, and suspension polymerization is carried out at 130° C. for another 2 hours.

Then the reactor contents is cooled, acidified to pH=2, water washed, centrifuged, and dried.

The resultant polymer has the following properties:

| Charpy impact strength, notched | 12.5 kJ/m² |
|---|---|
| Elongation | 45% |
| Melt flow index | 3.0 g/10 min |
| Residual monomer | 0.03 wt. % |

EXAMPLE 10

Preparation of Impact Polyvinyltoluene

The process is carried out as described in Example 9 except that styrene is replaced by vinyltoluene of the following composition: 35 wt. % of ortho-isomer, 65 wt. % of para-isomer: the prepolymer conversion being 27%, the bath ratio 10:3, the concentration of tricalcium phosphate 1.5 wt. % that of calcium carbonate, 0.35 wt. %, and that of secondary sodium alkylsulphates, 0.02 wt. %.

The polymer obtained has the following properties:

| Charpy impact strength, notched | 10.7 kJ/m² |
|---|---|
| Residual monomer | 0.04 wt. % |
| Elongation | 38% |
| Vicat softening point | 115° C. |
| Bead fractions with a particle diameter of below 0.2 mm | 0.7 wt. % |

EXAMPLE 11

Preparation of Weather Resistant Impact Polystyrene

The process is carried out as described in Example 9, with the following exceptions:

1. The rubber used is ethylene-propylene rubber containing 2.2 mol. % of ethylidene norbornene, taken in the amount of 15.5 wt. %, while styrene is taken in the amount of 136.4 wt. % by weight.

2. The prepolymerization process is carried out at 110° C. over a period of 4 hours until the styrene conversion is 35%, in the presence of 1,3-bis(tert-butyl peroxy isopropylbenzene) as radical-forming initiator in the amount of 0.155 parts by weight.

3. Normal lauryl mercaptan as molecular weight regulator is introduced in 0.01 parts by weight portions 4 times: on rubber dissolution, and 1, 2.5, and 3.5 hours after the beginning of the prepolymerization process.

4. The water phase is heated to 70° C.

5. The quantity of secondary sodium alylsulphates used is 0.006 wt. %.

6. After adding the second portion of 1,3-bis(tert-butyl peroxy isopropylbenzene) as radical-forming initiator, in the amount of 0.280 parts by weight, the temperature in the reactor is raised to 110° C. over a period of 45 minutes, with a subsequent holding period of 3 hours, and then to 140° C. over a period of 2.5 hours, with a subsequent holding period of 2 hours.

The resultant polymer has the following properties:

| Charpy impact strength, notched | 15 kJ/m² |
|---|---|
| Elongation at break | 35% |
| Melt flow index | 3.5 g/10 min |
| Residual monomer | 0.05 wt. % |
| Bead fractions with a particle diameter of below 0.2 mm | 0.5 wt. % |

EXAMPLE 12

Preparation of Styrene-methylmethacrylate-rubber Copolymer

Styrene (35.7 parts by weight), methylmethacrylate (108.5 parts by weight), and butadiene rubber (7.7 parts by weight), as well as tertiary dodecyl mercaptan (0.15 parts by weight) as molecular weight regulator, are charged, with stirring, into a reactor of 50 l capacity, and rubber dissolution is effected at 70° C. over a period of 2 hours. Next, dibutyl sebacate (3.1 parts by weight) as plasticizer and the first portion of initiator in the form of benzoyl peroxide (0.08 parts by weight) are added into the reactor. The temperature is raised to 80° C., and prepolymerization is carried out for 3.0 hours until the conversion of the comonomers reaches 15%. In the course of prepolymerization, tertiary dodecyl mercaptan is introduced again in 0.1 parts by weight portions 0.5, 1.5, and 2.5 hours after the beginning of the prepolymerization process.

Then a water phase containing 0.70 wt. % of tricalcium phosphate, prepared in advance and heated to 70° C., essentially as described in Example 3, and 0.20 wt. % of calcium carbonate are charged into the reactor. A mixture of secondary sodium alkylsulphates in the amount of 0.015 wt. % is charged in at the same time. The bath ratio is 5:3.

Immediately after the dispersion process and sampling to check the suspension obtained for stability, the second portion of initiators—benzoyl peroxide in the amount of 0.50 parts by weight and tert-butyl perbenzoate in the amount of 0.15 parts by weight—is added in, and suspension copolymerization is carried out at 80° C. for 3.5 hours. Then the temperature is raised to 130° C. over 2.5 hours and held at this level for 2 hours.

The reactor charge is cooled, acidified to pH=2, water washed, centrifuged, and dried.

The resultant polymer has the following properties:

| Izod impact strength, notched | 8 kJ/m² |
|---|---|
| Residual styrene | 0.05 wt. % |
| Transparency in the visible spectral region | 85% |
| Fractions with a particle diameter of below 0.2 mm | 0.5 wt. % |

EXAMPLE 13

Preparation of Styrene-acrylonitrile-rubber Copolymer

The process is carried out essentially as described in Example 12, but using a mixture of styrene (108.5 parts by weight) and acrylonitrile (35.7 parts by weight). Prepolymerization is carried out at 72° C. in the presence of benzoyl peroxide (0.15 parts by weight) for a period of 3 hours until the conversion of the comonomers reaches 20%. Tertiary dodecyl mercaptan is introduced in 0.04 parts by weight portions four times: during the dissolution of the rubber in the mixture of comonomers and 0.5, 1.5, and 2.5 hours after the beginning of the prepolymerization process.

At the comonomer conversion level of 20% a water phase previously heated to 70° C. is charged into the reactor, said water phase containing in-situ tricalcium phosphate (1.0 wt. %) obtained by pouring together at 20° C. solutions of anhydrous trisodium phosphate and anhydrous calcium chloride, and calcium carbonate (0.25 wt. %) introduced not later than 30 to 40 minutes after the pouring—together of said solutions. A mixture of secondary sodium alkylsulphates in the amount of 0.01 wt. % is introduced at the same time with the water phase. The suspension stage of the process is carried as described in Example 12 under the following temperature conditions: holding for 3 hours at 72° C., raising the temperature to 130° C. over 2.5 hours, and holding for 2 hours at 130° C.

The resultant polymer has the following properties:

| | |
|---|---|
| Izod impact strength, notched | 20 kJ/m$^2$ |
| Vicat softening temperature | 120° C. |
| Residual monomer | 0.05 wt. % |
| Fractions with a particle diameter of below 0.2 mm | 0.6 wt. % |

EXAMPLE 14

Preparation of Expandable Polystyrene

The process is carried out as described in Example 2, except that styrene is heated before dispersion to 90° C., permitting the reduction of the polymerization time by 30 to 45 minutes in case the water phase is not ready by the time when styrene is to be charged into the reactor.

The properties of the resultant polymer are the same as in Example 2.

EXAMPLE 15

Preparation of Styrene-acrylonitrile Copolymer

An oil phase similar in composition to that specified in Example 3 is charged, with stirring, into a reactor of 50 l capacity. The temperature in the reactor is brought up to 70° C., with the previously prepared water phase obtained as described in Example 3 charged thereafter. Then the process is carried out as described in Example 3. The polymerization time is reduced by 30 to 45 minutes in case the water phase is not ready by the time the oil phase is to be charged into the reactor.

The properties of the polymer so obtained are the same as in Example 3.

EXAMPLE 16

Preparation of Impact Polystyrene

The process is carried out essentially as described in Example 9 except that no initiator is introduced at the prepolymerization stage while the temperature is maintained at a level of 117° ±1° C.

The resultant polymer has the following properties:

| | |
|---|---|
| Charpy impact strength, notched | 10.3 kJ/m$^2$ |
| Elongation | 43% |
| Melt flow index | 3.1 g/10 min |
| Residual monomer | 0.04 wt. % |
| Fractions with a particle diameter of below 0.2 mm | 0.5 wt. % |

EXAMPLE 17

Preparation of Gel-structured Styrene-divinylbenzene Copolymer with a Bead Diameter of 0.4 to 0.8 mm An oil phase similar in composition to that specified in Example 4 is charged into a reactor of 10 m$^3$ capacity. The temperature in the reactor is raised, while stirring, to 75° C. over 1 to 1.5 hours, and prepolymerization is carried out for 4 hours. At 35% conversion, a previously prepared water phase obtained as described in Example 4 and a mixture of secondary sodium alkylsulphates in the amount of 0.006 wt. % are charged into the reactor. From this point on, the process is conducted as described in Example 4.

Bead size distribution:

| | |
|---|---|
| Mean diameter | 0.5 mm |
| Distribution index | 22.1 |
| Fractions with a particle diameter of below 0.2 mm | 0.3 wt. % |

The other properties of the resultant copolymer are similar to those stated in Example 4.

EXAMPLE 18 (CONTROL)

Preparation of Expandable Polystyrene

The process is conducted essentially as described in Example 2 except that the mixture of secondary sodium alkylsulphates in the amount of 0.008 wt. % is introduced at 50 percent conversion. A sample taken from the reactor shows that agglomeration of the reaction mass is to be observed.

EXAMPLE 19 (CONTROL)

Preparation of General-purpose Polystyrene

The process is conducted essentially as described in Example 5, but the mixture of secondary sodium alkylsulphates is charged into the reactor in the amount of 0.0008 wt. %. A sample taken from the reactor 10 to 15 minutes later shows that there is separation to be observed in the reaction mass due to a lack in the quantity of surface active agent present in the system.

EXAMPLE 20 (CONTROL)

Preparation of Styrene-methylmethacrylate-rubber Copolymer

The process is conducted essentially as described in Example 12, except that the water phase and the mixture of secondary sodium alkylsulphates are introduced at 13.5 percent conversion. The resultant product has properties similar to those stated in Example 11, but the content of fractions with a particle diameter of below 0.2 mm in the beads is 5.3 wt. %.

EXAMPLE 21 (CONTROL)

Preparation of Styrene-acrylonitrile Copolymer

The process is carried out essentially as described in Example 3, except that the water phase is not heated prior to dispersing the comonomers therein. The resultant copolymer has the same properties as stated in Example 3, but the fractions with a particle diameter of below 0.2 mm in the beads amount to 4.7 wt. %.

EXAMPLE 22 (CONTROL)

Preparation of Impact Polvinyltoluene

The process is carried out essentially as described in Example 10 except that the mixture of secondary sodium alkylsulphates is introduced in the amount of 0.023 wt. %. The properties of the resultant copolymer are similar to those stated in Example 9, but the fractions with a particle diameter of below 0.2 mm in the beads amount to 5.8 wt. %.

INDUSTRIAL APPLICABILITY

The invention can be used for the production of all types of styrene plastics which find wide applications in the manufacture of industrial and household products, including food packagings, in the radio, building, light engineering, electronic, and electrical engineering industries, in the production of ion-exchange resins, in reproduction and printing technologies, and so on.

We claim:

1. A method of preparing styrene polymers by suspension or mass-suspension polymerization of styrene or vinyl toluene, or by suspension or mass-suspension co-polymerization of styrene or vinyl toluene and methyl methacrylate and/or acrylonitrile or divinyl-benzene, or by mass-suspension copolymerization of styrene or vinyl toluene and methyl methacrylate and/or acrylonitrile, and/or rubber at temperatures below 140° C. in an aqueous medium, in the presence of a stabilizing system comprising 0.15 to 1.5 wt. % of tricalcium phosphate prepared in situ, calcium carbonate, and a mixture of secondary sodium alkylsulfates of the general formula R—OSO$_3$Na, where R is a hydrocarbon radical with 8 to 18 carbon atoms, characterized in that calcium carbonate in an amount of between 0.07 and 0.35 wt. % is introduced into an aqueous suspension of in-situ tricalcium phosphate, and the mixture thus obtained is heated before dispersing therein the polymerizable vinyl monomers or prepolymer to be polymerized, while the mixture of secondary sodium alkasulfates in an amount of between 0.001 and 0.020 wt. % is introduced into the suspension polymerization process when the conversion of the monomer comonomers or prepolymer is at 15% to 47%.

2. A method of preparing styrene polymers as defined in claim 1, characterized in that the aqueous suspension of mixed tricalcium phosphate prepared in situ and calcium carbonate is heated to a temperature of 70° to 90° C.

3. A method of preparing styrene polymers as defined in claim 1 or 2 wherein the products to be polymerized are styrene or vinyl toluene or comonomers of styrene or vinyl toluene and derivatives of acrylic and/or methacrylic acids as comonomers, characterized in that the mixture of secondary sodium alkylsulphates is introduced into the suspension polymerization process when the conversion of said monomer or comonomers is at 25 to 47%.

4. A method of preparing styrene polymers as defined in claim 1 or 2, wherein the product to be polymerized is a prepolymer based on rubber and styrene or vinyl toluene and derivatives of acrylic and/or methacrylic acids, characterized in that the mixture of secondary sodium alkylsulphates is introduced into the suspension polymerization process when the conversion of said prepolymer is at 15 to 35%.

5. A method of preparing styrene polymers as defined in claim 3, characterized in that the monomer or comonomers are heated to a temperature of between 70° and 90° C. before they are dispersed.

6. A method of preparing styrene polymers as defined in claim 1, characterized in that in-situ tricalcium phosphate is obtained by pouring together a solution of calcium chloride in the form of hydrate with 6 water molecules and a solution of trisodium phosphate in the form of hydrate with 12 water molecules.

7. A method of preparing styrene polymers as defined in claim 1, wherein suspension polymerization is carried out in the presence of radical-forming initiators, characterized in that at least part of the total quantity of the radical-forming initiators is introduced into the monomer/comonomers/prepolymer suspension at a temperature of between 70° and 90° C.

* * * * *